US007330193B2

(12) United States Patent
Bhattacharjya

(10) Patent No.: US 7,330,193 B2
(45) Date of Patent: Feb. 12, 2008

(54) LOW NOISE DITHERING AND COLOR PALETTE DESIGNS

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 11/177,787

(22) Filed: Jul. 8, 2005

(65) Prior Publication Data

US 2007/0008335 A1 Jan. 11, 2007

(51) Int. Cl.

| | |
|---|---|
| ***G06T 5/00*** | (2006.01) |
| ***G06T 1/00*** | (2006.01) |
| ***G09G 5/02*** | (2006.01) |
| ***H04N 1/52*** | (2006.01) |
| *H04N 1/60* | (2006.01) |
| *B41J 2/525* | (2006.01) |

(52) U.S. Cl. ...................... 345/593; 345/589; 345/596; 345/606; 345/643; 358/3.13; 358/518; 358/525; 348/557; 382/162; 382/167

(58) Field of Classification Search ........ 345/589–594, 345/596–601, 606, 639, 586, 643–644; 348/557, 348/566, 603–607, 612, 683, 659–661; 358/3.13–3.16, 358/1.9, 525, 518–520, 533, 535
See application file for complete search history.

(56) References Cited

U.S. PATENT DOCUMENTS

| | | | | |
|---|---|---|---|---|
| 5,732,205 | A | 3/1998 | Astle | |
| 6,304,333 | B1 * | 10/2001 | Shaked et al. | 358/1.1 |
| 6,496,186 | B1 | 12/2002 | Deering | |
| 6,606,166 | B1 * | 8/2003 | Knoll | 358/1.9 |
| 6,711,299 | B2 | 3/2004 | Chao et al. | |
| 6,819,793 | B1 | 11/2004 | Reshetov et al. | |
| 2003/0059108 | A1 * | 3/2003 | Hubel | 382/165 |
| 2004/0071351 | A1 | 4/2004 | Rade | |
| 2005/0179915 | A1 * | 8/2005 | Tsukada | 358/1.9 |

* cited by examiner

*Primary Examiner*—Wesner Sajous

(57) ABSTRACT

Methods for choosing and combining colors from a color palette to render an image color tone are disclosed. A set of up to four palette colors are chosen and the weighted factors for combining the chosen palette to render the image color are determined. The weighted factors of the chosen palette colors are ordered according to an ordering criterion or criteria. The color output of a display pixel is the chosen palette color associated with the interval in which the threshold value falls. Color data compression may also be achieved by eliminating at least one color from the set of chosen palette colors used to render an image color that fails to exceed a specified threshold value. Also disclosed are methods for designing uniform and non-uniform color palettes.

15 Claims, 10 Drawing Sheets

LOW NOISE DITHERING AND COLOR PALETTE DESIGNS

BACKGROUND

1. Field of the Invention

The present invention relates generally to the field of imaging processing, and more particularly to rendering color images.

2. Background of the Invention

Display devices, such as printers, cathode ray tubes (CRT), plasma screens, liquid-crystal displays (LCD), and the like render images using small spots, referred to as "picture elements" or "pixels." At times, an image with a broader range of colors than the device's limited number of basic colors may need to be rendered by the device. Increased color depth may be obtained at the expense of spatial resolution by adding colored noise to the displayed pixels and relying on the human visual system to filter out the noise and perceive a wider range of colors.

One method for creating the appearance of new colors and shades is called "dithering." Although a number of dithering methods exist, dithering generally involves comparing image pixels values with respective threshold values of a dithering matrix. A dithering matrix, which consists of an array of threshold values, is conceptually overlaid onto the image pixel array. Each of the image pixels is processed by comparing its tonal value to the associated dither matrix value. The output value, i.e., the rendered image or display pixel value, is generated based on the comparison. For example, if the display supports only binary output, the input image pixels may be mapped to output pixels as follows. If the image value equals or exceeds the dither matrix threshold value, the output pixel is illuminated or receives an ink dot (depending on whether the display device is a screen or a printer). Otherwise, it is not illuminated or does not receive an ink dot. Note that if the dither matrix is smaller than the image array, the dither array is tiled (i.e., repeated side-by-side) over the image array in order to cover the entire image array. The described binary dither can be extended to multi-level dither schemes for devices that support multiple output levels at each pixel location.

Although dithering can be an effective method for trading off spatial resolution to improve perceived color depth, there are limits to its use. For example, multi-level dithering for low and medium resolution devices poses problems since the dither noise may easily become unacceptably visible due to insufficient spatial resolution. Furthermore, a direct extension of monochrome multi-level dither techniques to multiple color channels can result in higher noise and visual artifacts arising from dithering between too many palette colors to render a target color and from interference effects between the different or same dither matrices used to dither the different color channels.

Because most color dithering techniques involve dithering each device color coordinate independently, if a display device has n device color coordinates (e.g., for a Red-Green-Blue (RGB) display, n=3, for a Cyan-Magenta-Yellow-Black (CMYK) display, n=4), dithering each device color coordinate independently, by direct extension of monochrome dithering methods, results in using linear combinations of up to $2^n$ palette colors. And, these colors are constrained to be the outer product of the colors along each device color axis, which results in much reduced freedom for choosing the colors that comprise the palette. While increasing the number of colors in a palette reduces dither noise, dithering between a large number of colors from a small color palette, particularly in a low or medium resolution device, typically results in increased perceived noise in the dithered image. Furthermore, since there is limited freedom in choosing the colors that form the palette (since each channel is independently dithered), perpetually significant regions, such as, for example, face tones, cannot be given more bits for smoother representation without significantly sacrificing color quality in other regions of the color gamut.

Accordingly, what is needed are low-noise dithering methods, particularly low-noise dithering methods for use with displays with spatial resolution limits or with color palettes that contain a number of pre-allocated colors.

SUMMARY OF THE INVENTION

According to one aspect of the present invention, systems and methods for choosing and combining colors from a color palette to render a color tone are disclosed. In an embodiment, an image color may be rendered by selecting a set of up to four chosen palette colors such that the image color lies in a convex hull of the set of up to four chosen palette colors. The four chosen palette colors are assigned weighted factors such that the image color may be represented by a linear combination of the chosen palette colors in proportions given by the weighted factors. The weighted factors of the chosen palette colors are ordered according to an ordering criterion or criteria. The chosen palette color outputted to a particular display location is the chosen palette color that corresponds to the weighted factor that when added to the other weighted factors according the ordering criteria contains or equals the threshold value as indicated by a dither matrix. That is, the color output of a display pixel is the chosen palette color associated with the interval in which the dither matrix threshold value falls.

According to another aspect of the present invention, systems and methods are disclosed for performing color data compression. In an embodiment, color data compression may also be achieved by eliminating at least one color from the set of chosen palette colors used to render an image color that fails to exceed a specified threshold value.

According to another aspect of the present invention, systems and methods are disclosed for designing a color palette. In an embodiment, a color palette for a device may be designed by defining an acceptable noise level, which may be specified as the maximum allowable distance between a palette color and any color to be rendered. Measurements are collected by uniformly sampling the device color gamut over the device coordinates. Delaunay tetrahedrons of the measurements are constructed, and measurements are iteratively added or deleted to satisfy the acceptable noise level requirement or requirements and to reduce the number of colors in the color palette as determined by a bit budget of a dither.

In an embodiment, the maximum acceptable noise limit may be uniform across the entire color gamut. Alternatively, the maximum acceptable noise limit may vary depending upon the region of color space.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 depicts a method for dithering an image color according to an embodiment of the present invention.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. Furthermore, the appearance of the phrase "in one embodiment," "in an embodiment," or the like in various places in the specification are not necessarily all referring to the same embodiment.

1. Generalized Theory for Dithering

The following section sets forth a general theory for dithering independent of the number of color channels used to render a color on the device display. Following this section is a section providing an example to further clarify the present invention and to present alternate embodiments. It should be noted that the examples and embodiments provided herein are for purposes of illustration and shall not be construed to limit the scope of the present invention.

Figure 1:
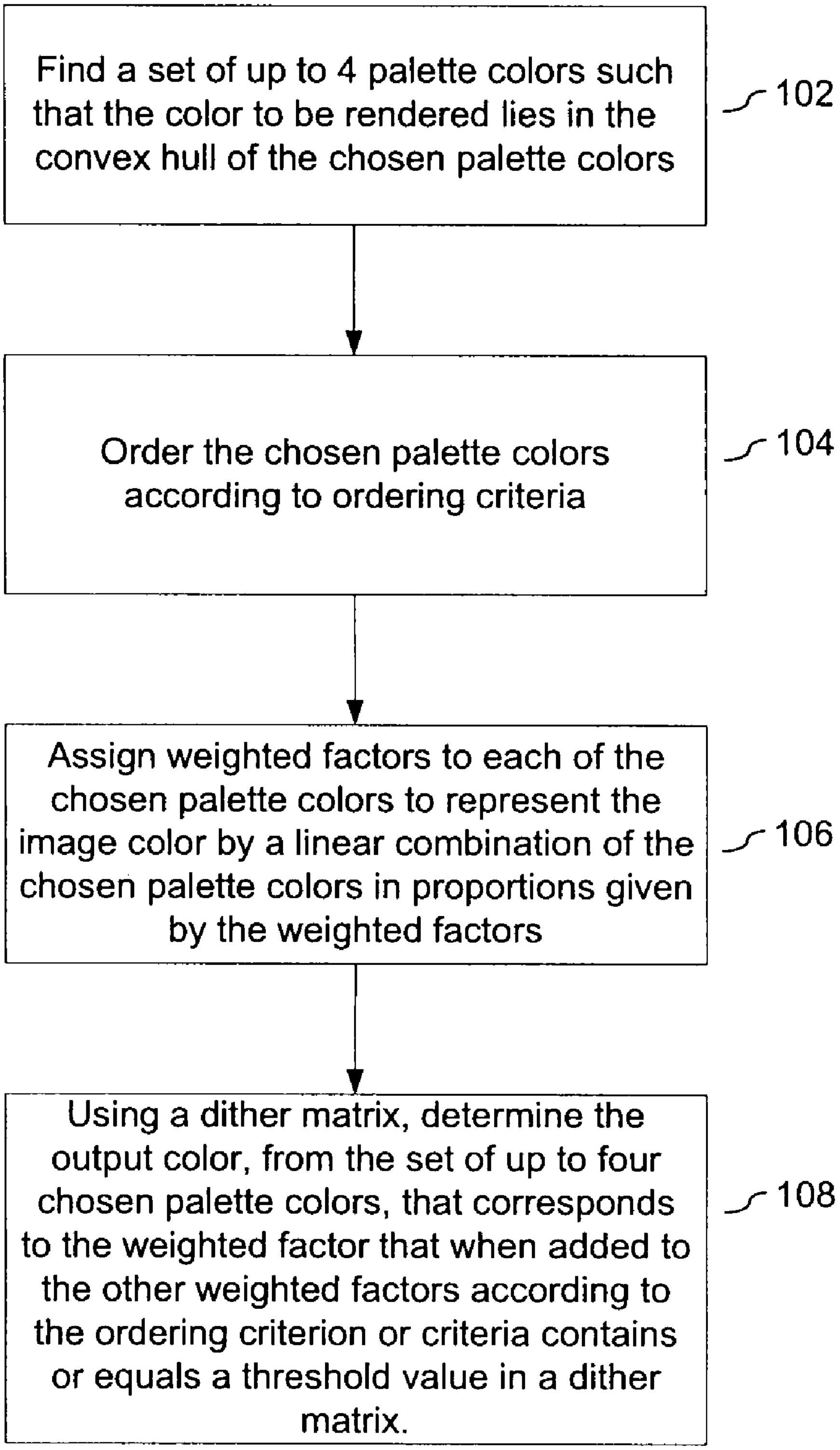

FIG. 1 depicts a method for depicting a color to be rendered, also referred to herein as the image color, according to an embodiment of the present invention. The color response of the human visual system can be approximated using a three dimensional perceptually linear space, such as CIE Lab as defined by the International Commission on Illumination (known as the CE for its French title "Commission Internationale de 1'Eclairage"). Given a palette of colors that covers the entire color gamut of a display device, meaning that the display device gamut is within the convex hull formed by the colors in CIE Lab space, a color may be represented as a linear combination of up to 4 colors in the palette. Spatial dithering techniques may be used to combine colors linearly to achieve a color approximation for a color that does not belong to the device color palette. First, a set of up to four palette colors are chosen 102 such that an image color to be rendered lies in the convex hull of the chosen palette colors. A linear combination of this set of the chosen palette colors will be used to render the image color. In an embodiment, the noise is minimized by finding a set of palette colors that minimizes the diameter of the convex hull of the set of up to four chosen palette colors. By selecting the set of chosen palette colors with the smallest diameter of the convex hull, no other set of palette colors exhibits less noise than the set of chosen palette colors. Denote this set of chosen palette colors by Nbd(c), where c is the image color to be rendered.

The chosen palette colors in Nbd(c) are ordered 104 according to ordering criteria. The ordering criteria may comprise one or more parameters by which the chosen palette colors may be ordered. In an embodiment, the criteria for ordering the chosen palette colors may be based upon visual sensitivity or perception. The visual sensitivity may depend upon a number of factors, including, but not limited to, the type of display (e.g., whether the display device is additive or subtractive), background color, lightness or luminance, hue, saturation, and the like. In one embodiment, the chosen palette colors are first ordered according to luminance, and if any of the chosen palette colors have equal luminance, those colors may be ordered by saturation, hue, or both. The ordered set of chosen palette colors may be denoted:

$$\{c_i: \in \mathrm{Nbd}(c)\}$$

Each of the chosen palette colors in the set of up to four chosen palette colors are assigned 106 weighted factors to render the image color as a linear combination of the chosen palette colors in proportions given by the weighted factors. Since the image color to be rendered lies in the convex hull of the chosen palette colors in Nbd(c), the image color, c, can be represented as a linear combination of these colors. In an embodiment, the linear combination may be obtained by locating in the color space the tetrahedron enclosing the image color and by finding the barycentric coefficients used to express the image color as a linear combination of the tetrahedron's vertices. These barycentric coefficients, $b_i$, represent the proportional amounts of chosen palette colors used to reproduce the image color:

$$c=\Sigma_{Nbd(c)} b_i c_i, \text{ where, } b_i \in [0,1] \text{ and } \Sigma_i b_i = 1$$

That is, the image color, c, can be rendered by mixing the chosen palette colors, $c_i$, in the proportions given by their weighted factors, $b_i$. One skilled in the art will also recognize that the ranking and ordering of the chosen palette colors may be configured differently depending upon the display conditions, including whether the display is an additive or a subtractive display. Furthermore, one skilled in the art will recognize that certain of the steps illustrated herein may be performed in different orders. For example, the weighted factors may be obtained prior to ordering of the colors.

Having determined and ordered the weighted factors of the chosen palette colors, a single dither matrix may be used to mix the chosen palette colors in the proper proportions. It should be noted that the present invention may be used with dither matrices of various sizes, orientations, and desired pixel or color growth patterns.

The output color for a particular pixel may be obtained as follows. If $r_{mn}$ denotes the rank of the pixel location (m, n) as determined by the dither matrix, and if M and N denote the number of rows and columns of the dither matrix, the ratio, $d_{mn}=r_{mn}/(MN)$, represents the threshold value for that rank and it lies in the range [0,1]. Let $$S_k = \sum_{i=1}^{k} b_i$$

denote the partial sum of the first k weights corresponding to the ordered set of colors belonging to Nbd(c). If $\hat{k}$ is the smallest value for k for which $S_k$ exceeds or is equal to the threshold value, the chosen palette color outputted 108 at location (m, n) is given by $c_{\hat{k}}$.

To illustrate further, assume for the purposes of illustration that the ordered chosen palette colors are $c_1$, $c_2$, $c_3$, and $c_4$, being ordered from most significant to least significant color according to the ordering criteria and that the weighted factors for the ordered set of chosen palette colors are respectively, $b_1$, $b_2$, $b_3$, and $b_4$. The color outputted by the dither matrix may be determined according to the following:

$c_1$, where $d_{mn} \leqq b_1$;

$c_2$, where $b_1 < d_{mn} \leqq (b_1+b_2)$;

$c_3$, where $(b_1+b_2) < d_{mn} \leqq (b_1+b_2+b_3)$; and $c_4$, where $(b_1+b_2+b_3) < d_{mn} \leqq 1$.

It should be noted that the present invention provides a number of benefits. First, noise is reduced by minimizing the set of colors used to render any given color. That is, the reduced color set is optimal in the sense that no fewer colors from the color palette can be used to render the color with lower noise. Second, because the present invention may use a single dither matrix, it eliminates the problem of dither interference artifacts across multiple color channels. Furthermore, because the present invention may use a single dither matrix, it eliminates the problem of designing separate dither matrices for each color channel to minimize cross-channel dither interference artifacts. In addition, the present invention is amenable to fast implementations, whether implemented in software, hardware, firmware, or any combination thereof. Because embodiments of the present inventions employ a single dither matrix and because dithering involves a simple comparison between the dither matrix threshold values and the ordered weighted factors, the computation resources required to process an image are not substantial. Finally, it should be noted that because chosen palette colors are ordered according to an ordering criterion or criteria, such as lightness, the most critical chosen colors receive the best ranked location. Since the most important chosen colors receive the best rank locations, the present invention promotes visually pleasing renderings.

2. Illustration of the Generalized Theory

Figure 2:
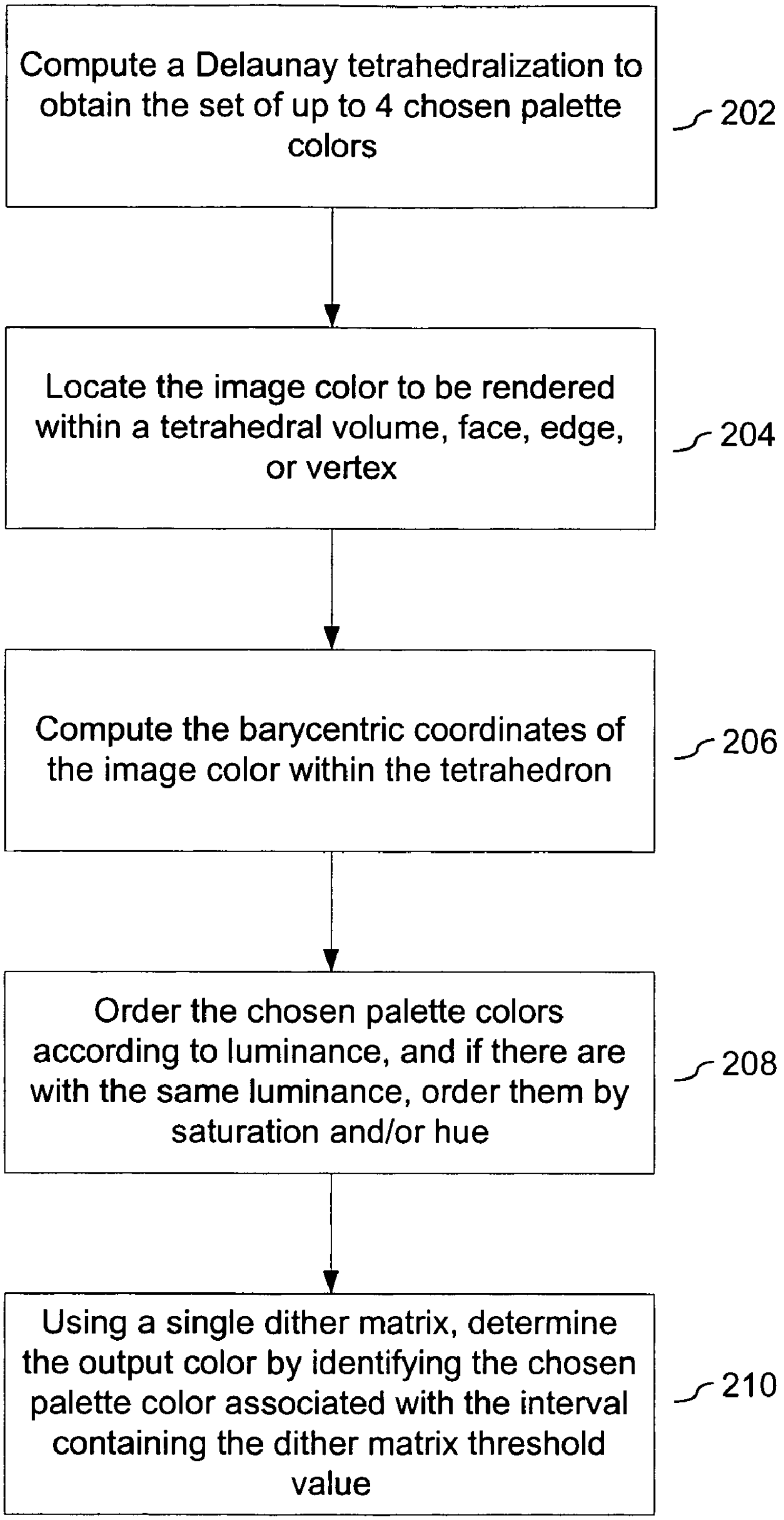
FIG. 2 depicts a method for dithering an image color according to an embodiment of the present invention FIG. 3 graphically illustrates a Delaunay tetrahedralization of an image color according to an embodiment of the present invention.

The foregoing discussion illustrated embodiments of the present invention in general terms. To aid understanding and to illustrate additional aspects and embodiments of the present invention, a method for rendering an image color according to an embodiment of the present invention is depicted in FIG. 2.

Figure 3:
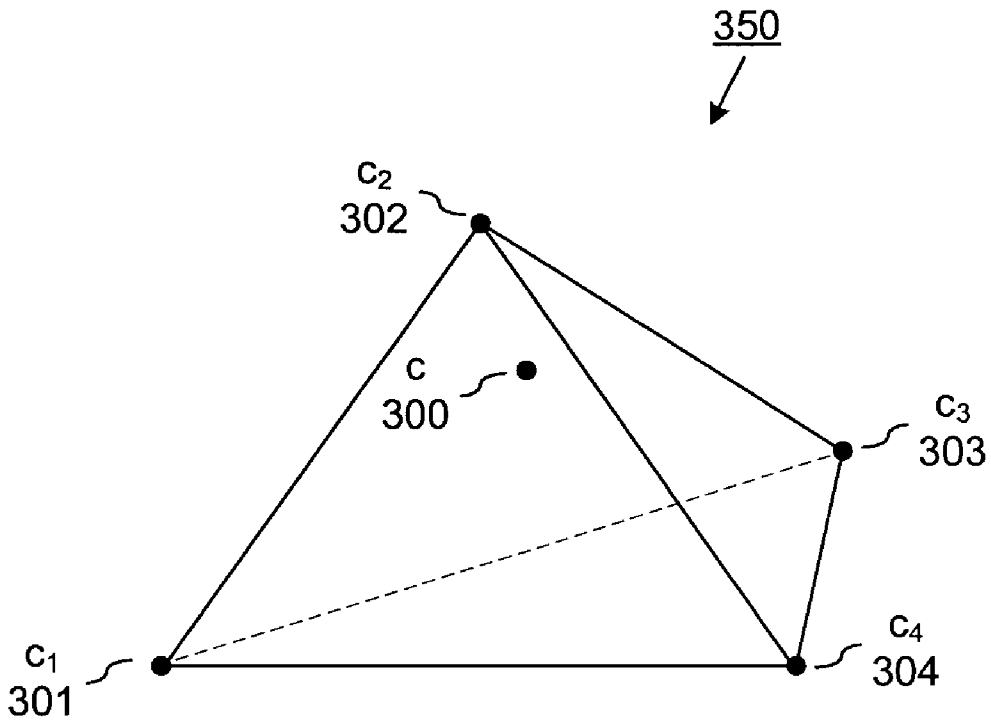

In the embodiment, a set of up to four chosen palette colors may be obtained by computing 202 a Delaunay tetrahedralization of the palette colors in Lab space. One skilled in the art will recognize that other color spaces may be used. FIG. 3 graphically illustrates a Delaunay tetrahedralization 350. Note that the color to be rendered 300 lies in the convex hull of the tetrahedron 350 formed by the chosen palette colors, $c_1$ 301, $c_2$ 302, $c_3$ 303, and $c_4$ 304.

Having obtained the set of up to four chosen palette colors, the weighted factors for the chosen palette colors may be obtained. The color to be rendered is located 204 within a tetrahedral volume, face, edge, or vertex, and the barycentric coordinates, $b_i$, of the image color, c 300, are computed 206 within the containing tetrahedron. The image color to be rendered, c 300, may then be mathematically depicted as the linear sum of the chosen palette colors multiplied by their respective weighted factors:

$$c = b_1c_1 + b_2c_2 + b_3c_3 + b_4c_4, \quad \text{where, } b_i \in [0, 1] \text{ and } \sum_{i=1}^{4} b_i = 1$$

Figure 4:
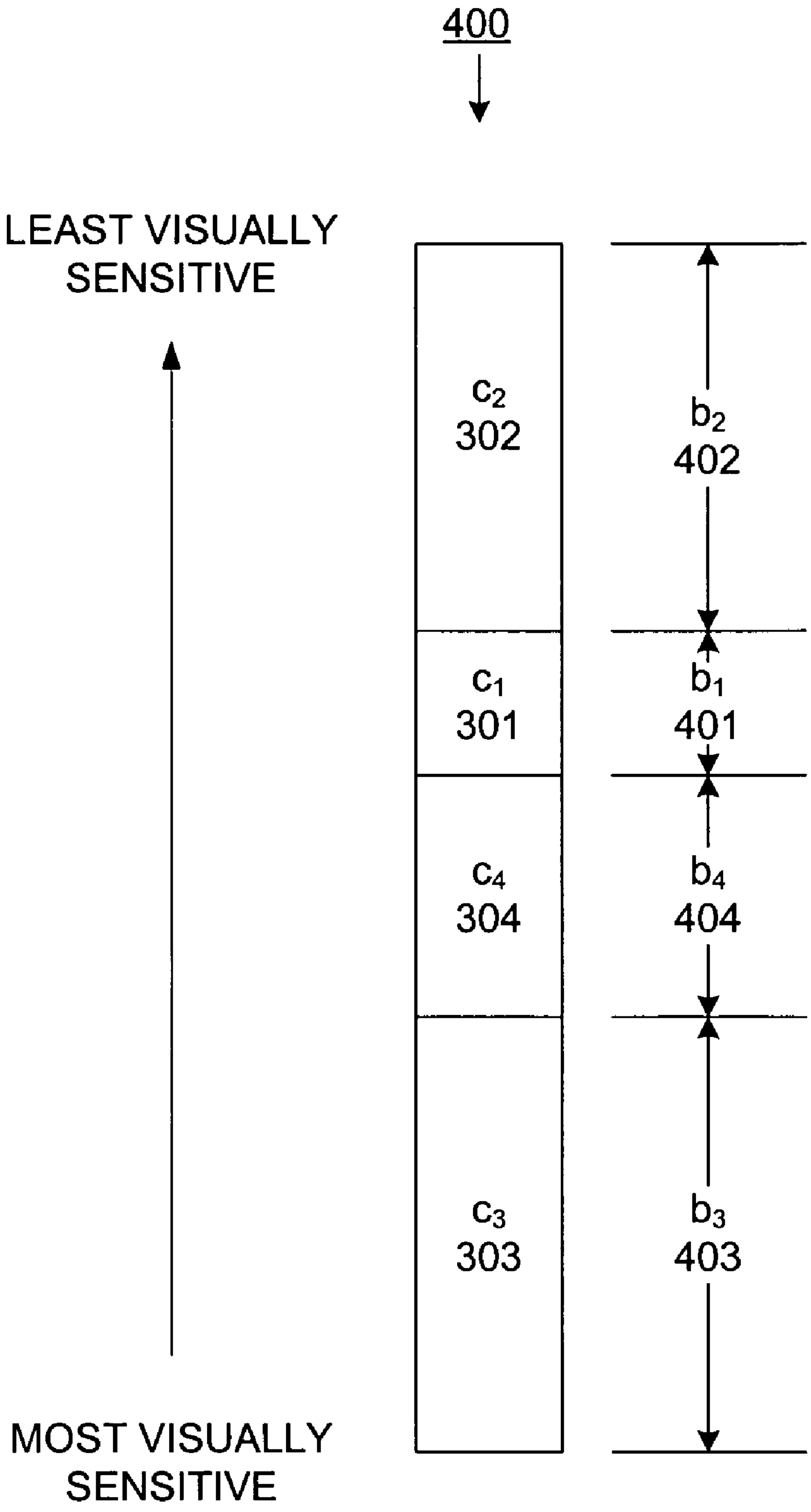
FIG. 4 graphically illustrates an ordered set of chosen palette colors for a rendering an image color according to an embodiment of the present invention.

Assume for the sake of illustration that $b_1=1/8$, $b_2=5/16$, $b_3=5/16$, and $b_4=1/4$. Note that the weighted factors have been chosen to simplify the illustration. Having obtained the weighted factors, the chosen palette colors are ordered 208 according to ordering criteria or criterion. In an embodiment, the criteria for ordering the chosen palette colors may be based upon visual sensitivity. In one embodiment, the chosen palette colors are ordered according to lightness and if any of the chosen palette colors have equal lightness, they are ordered by at least one additional parameter, such as, saturation, hue, or both saturation and hue. Assume, for the purposes of the present example, that the chosen palette colors are ordered $c_3$, $c_4$, $c_1$, and $c_2$, ranging from the most visually sensitive to the least visually sensitive. FIG. 4 graphically depicts the ordered set 400 of the chosen palette colors. The heights 401-404 of the ordered set 400 represents the respective weighted factors, $b_1$-$b_4$, obtained above from the barycentric coordinates.

Figure 5:
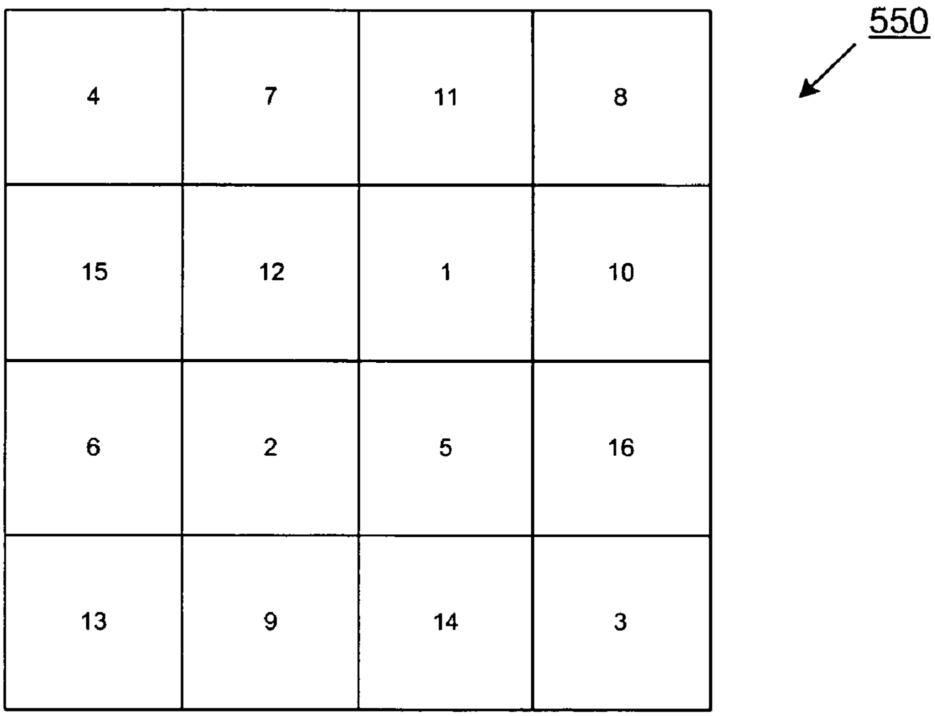
FIG. 5 depicts a sample dither matrix for illustrating embodiments of the present invention.
Figure 6:
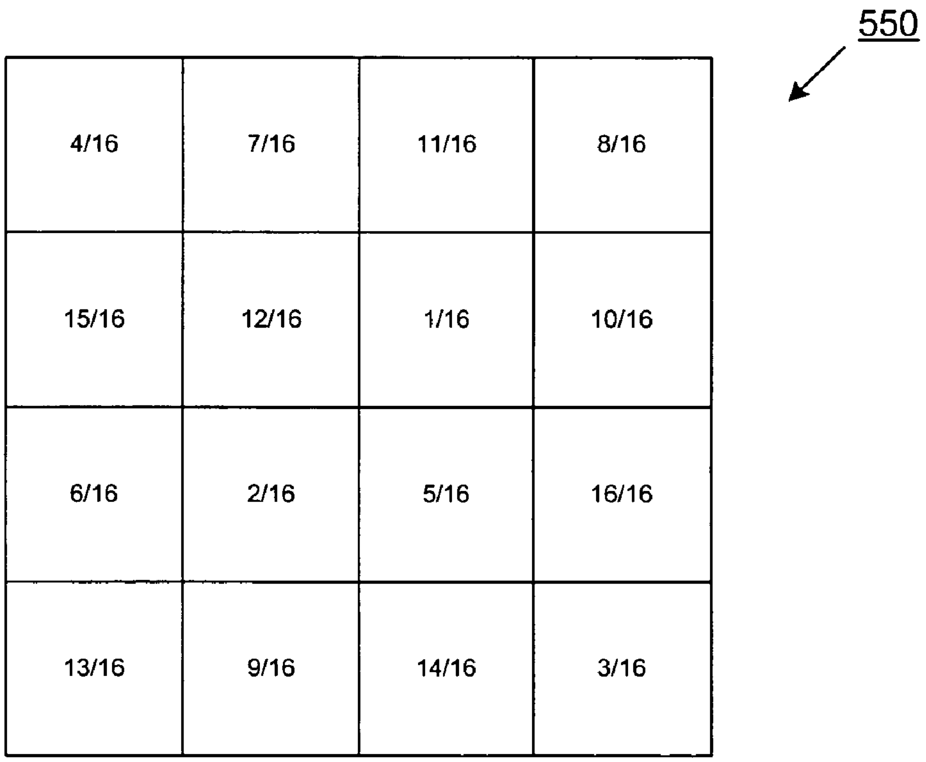
FIG. 6 depicts the sample dither matrix of FIG. 5 wherein the threshold values have been adjusted normalized to be between 0 and 1 according to an embodiment of the present invention.

Turning to FIG. 5, a sample dither matrix 550 is depicted. The locations within the matrix are ranked 1 through 16, wherein locations with lower ranks have better spatial distribution (perceived noise) than locations with higher ranks. The dependence of distribution uniformity on the rank of a location in a dither matrix is a well-known phenomenon to one skilled in the art. One skilled in the art will recognize that a number of methods exist for selecting the ranks in a dither matrix. However, it should be noted that no particular rank method is critical to the practice of the present invention. Indeed, one skilled in the art will recognize that the present invention is not concerned with how the rank has been obtained. Rather, the present invention may be practiced given a dither matrix, regardless of whether the locations within the dither matrix have been ranked. FIG. 6 depicts the dither matrix 550 wherein the threshold values, $d_{mn}$, have been adjusted to be between 0 and 1 by dividing the rank by the product of the number of rows and columns (MN) of the matrix, in this case 16.

Figure 7:
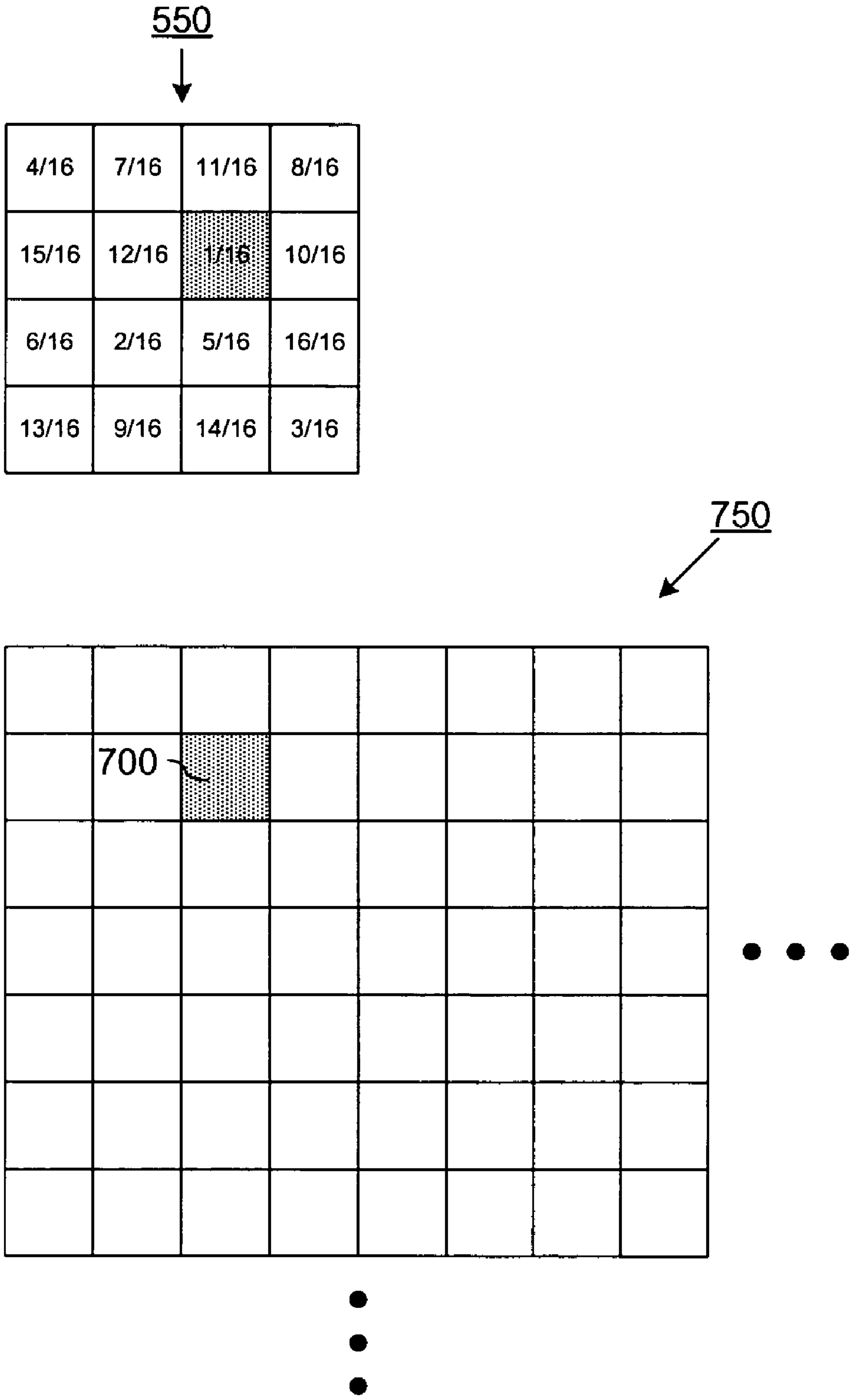
FIG. 7 illustrates a correlation between a display pixel location and the sample dither matrix of FIG. 5, wherein the threshold value for a pixel of the display is obtained from a corresponding dither matrix location according to an embodiment of the present invention.
Figure 8:
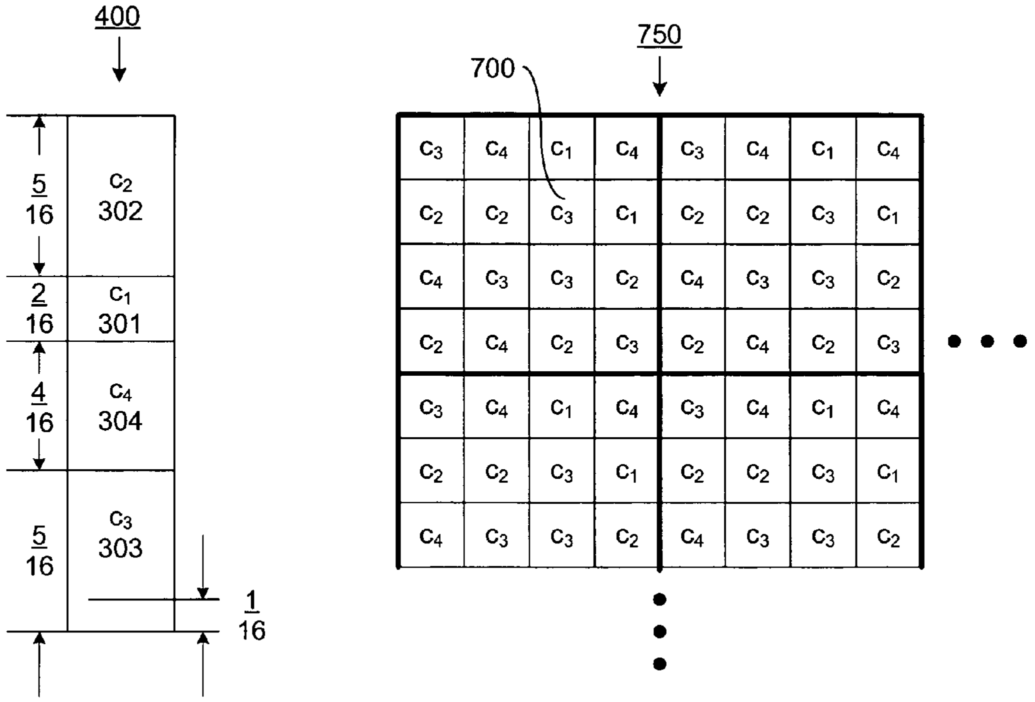
FIG. 8 illustrates that the color output at a display pixel location is obtained by comparing the dither matrix threshold value to the ordered set of chosen palette colors according to an embodiment of the present invention.

FIG. 7 depicts a portion of a display device 750. Consider display pixel 700. To determine the output display color for that pixel, the threshold value from the dither matrix 550 is identified by conceptually overlaying the dither matrix onto the display 750. Pixel 700 correlates to the threshold value of 1/16. As illustrated in FIG. 8, the output color is determined by comparing the threshold value, 1/16, to the ordered set of chosen palette colors 400. The output color from the set of chosen palette color is identified 210 as the chosen palette color associated with the interval containing the dither matrix threshold value. Since the threshold value, 1/16, is within the interval of $c_3$, the output color for pixel 700 is $c_3$. The other pixels in display 750 are similarly determined. Since dither matrix 550 is smaller than the display 750, dither matrix 550 may be tiled over the image periodically.

3. Color Compression

Figure 9:
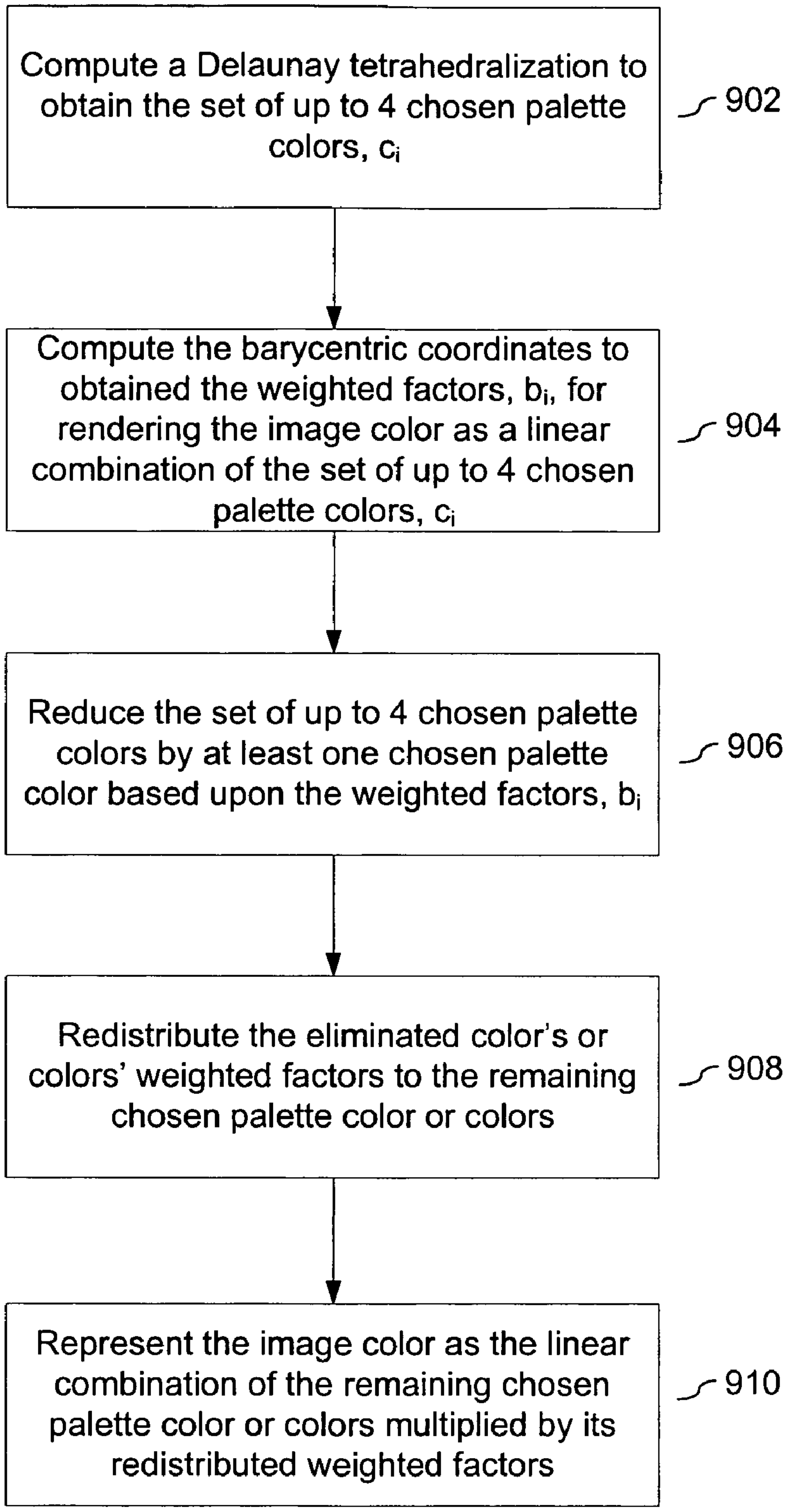
FIG. 9 depicts a method for compressing the color data according to an embodiment of the present invention.

Embodiments of the present may include methods for compressing the color data. FIG. 9 illustrates a method for compressing the color data according to an embodiment of the present invention. As with the embodiment described with respect to FIG. 2, a set of up to four chosen palette colors may be obtained by computing 902 a Delaunay tetrahedralization of the palette colors, $c_i$. Having obtained the set of up to four chosen palette colors, the weighted factors for the chosen palette colors may be obtained 904 by computing the barycentric coordinates, $b_i$, of the image color to be rendered.

Having obtained the chosen palette colors, $c_i$, and their respective weighted factors, $b_i$, the set of up to 4 chosen palette colors may be reduced 906 by at least one chosen palette color. In one embodiment, if a weighted factor falls below a threshold value, the chosen color associated with that weighted factor may be eliminated from the set of chosen colors. In an alternate embodiment, one or more chosen palette colors may be eliminated based upon their weighted factors. In yet another embodiment, if a color or colors exceed a certain threshold value, the set of chosen palette colors may be reduced by eliminating the other chosen palette colors that do not exceed the threshold value.

With one or more chosen colors eliminated, the eliminated color's or colors' weighted factors may be redistributed 908 to the remaining chosen palette color or colors. In one embodiment, the weighted factor or factors are redistributed in proportion to the remaining chosen colors original weighted factors. The color to be rendered may be represented as the linear combination of the remaining chosen palette color or colors multiplied by its redistributed weighted factor. Having reduced the color set, the color data for rendering the color is also reduced or compressed.

By way of illustration, consider the following two examples. For both examples, assume that four colors, $c_1$-$c_4$, were identified and that the weighted factors are $b_1$-$b_4$, respectively.

Assume for the purpose of this first example that $b_3$ falls below a specified minimum threshold level. To compress the color data, $b_3$ is set to zero, and its weighted factor is redistributed to the remaining chosen colors according to the following:

$$b_{1\_redistributed}=b_1/(b_1+b_2+b_4)$$

$$b_{2\_redistributed}=b_2/(b_1+b_2+b_4)$$

$$b_{4\_redistributed}=b_4/(b_1+b_2+b_4)$$

Accordingly, the color to be rendered may now be represented by the reduced set of information:

$$c=b_{1\_redistributed}c_1+b_{2\_redistributed}c_2+b_{4\_redistributed}c_4.$$

Assume for the purpose of the second example that $b_3$ is above a specified maximum threshold level. That means, that the color to be rendered is very near the color associated with $b_3$, namely $c_3$. Accordingly, to compress the color data, $b_1$, $b_2$, and $b_4$ are set to zero, and the weighted factor, $b_3$, for the remaining chosen color's, $c_3$, is set to 100%. Accordingly, the image color to be rendered may now be represented by the reduced set of information:

$$c=c_3.$$

The present invention is not limited to the foregoing examples. One skilled in the art will recognize that other methods for reducing the set of up to four chosen palette colors are within the scope of the present invention. One skilled in the art will also recognize that the data compression methods described in this section may be used to process, transmit, store, and/or render color data.

4. Color Palette Design

The previous sections described the methods for choosing and combining colors chosen from a color palette to render a given color tone. This section sets forth a further aspect of the present invention, namely methods for constructing color good palettes. The present invention provides greater flexibility in the design of color palettes, including custom allocation of bits to different regions of the color gamut.

Figure 10:
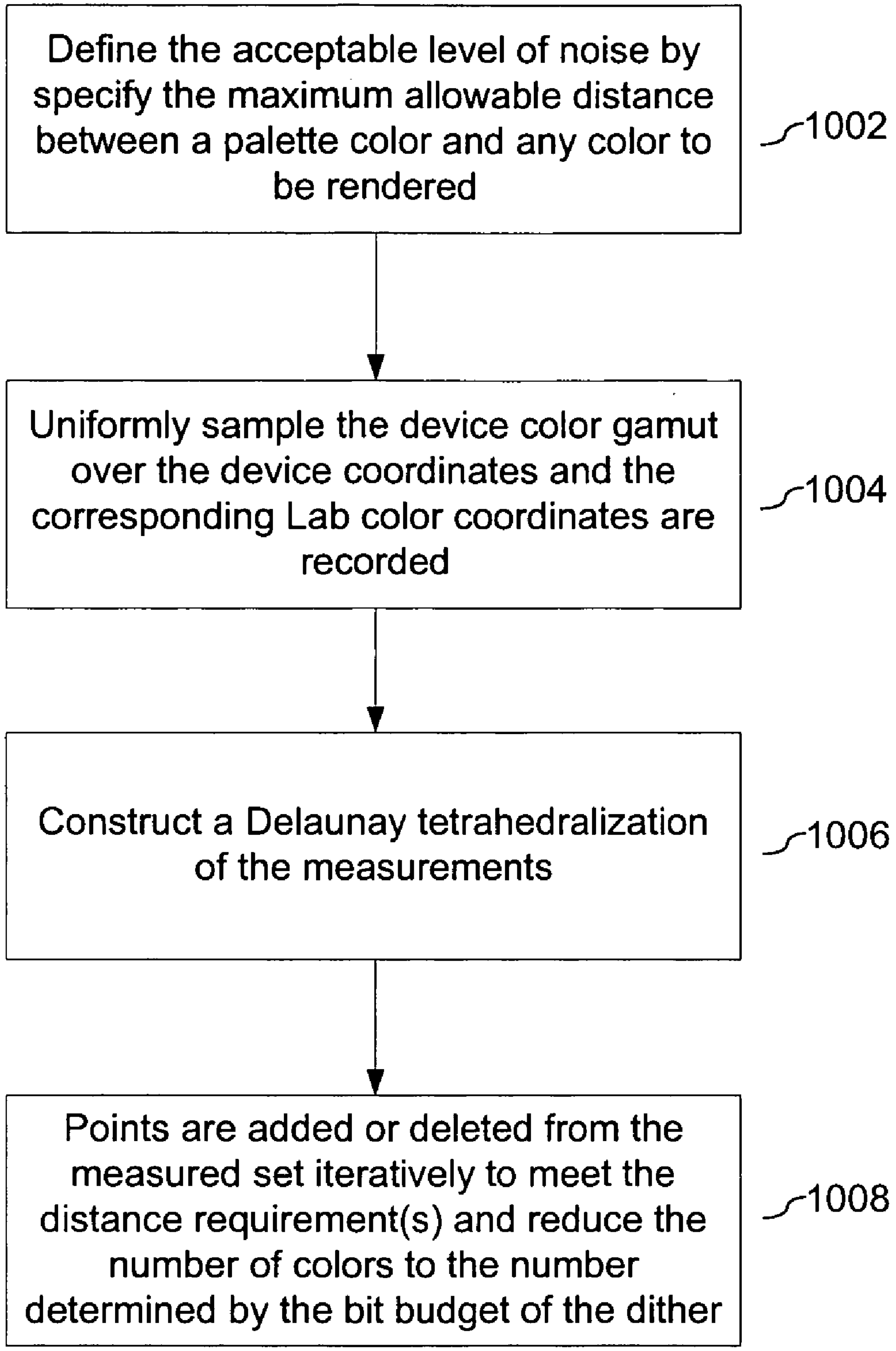
FIG. 10 depicts a method for designing a color palette according to an embodiment of the present invention.

FIG. 10 depicts a method for designing a color palette according to an embodiment of the present invention. As illustrated in FIG. 10, the color palette design commences by defining 1002 the level of noise that is acceptable in different parts of the color space. The level of noise is defined by specifying 1002 the maximum allowable distance between a palette color and any color to be rendered. In an embodiment, the maximum allowable distance may be uniform across the entire color gamut.

Figure 11:
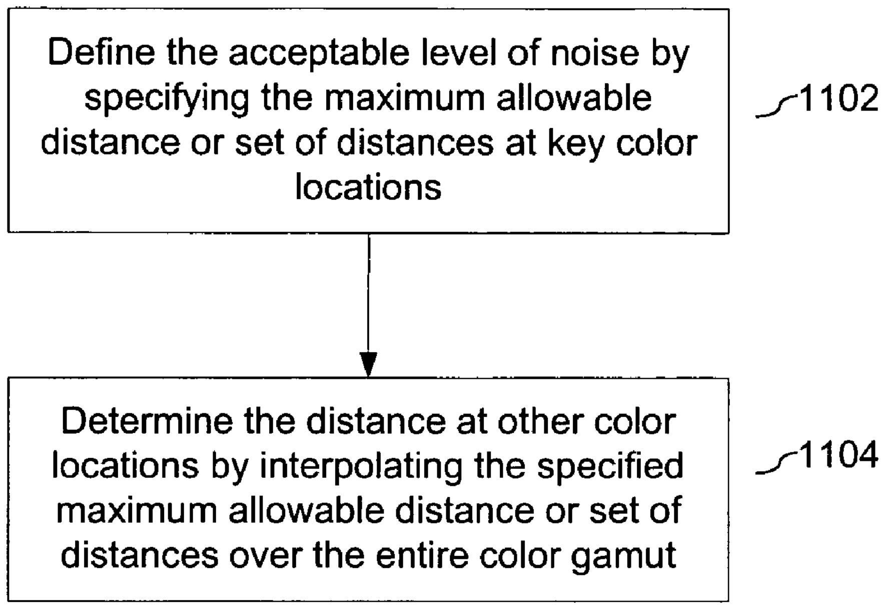
FIG. 11 depicts a method for designing non-linear noise levels across a color palette according to an embodiment of the present invention.

Alternatively, the maximum allowable distance between a palette color and a color to be rendered may vary depending upon the region of color space. That is, the maximum allowable distance may be smaller near colors representing certain colors, such as, for example, skin tones. FIG. 11 illustrates a method for implementing a non-uniform noise level over the color gamut. First, a maximum allowable distance or set of distances are specified 1102 at key color locations within the color gamut. The distance at other color locations is determined by smoothly interpolating 1104 the specified maximum allowable distance or set of distances over the entire color gamut.

Returning to FIG. 10, the device color gamut is uniformly sampled 1004 over the device color coordinates and the corresponding Lab color coordinates are recorded. A Delaunay tetrahedralization of the measurements is constructed 1006, and points are iteratively added or deleted 1008 from the measured set in order to meet the distance requirement or requirements and to reduce the number of colors to the number determined by the bit budget of the dither. In an embodiment, during the iterative process, if a tetrahedron is too large, a new sample point may be inserted by measuring the color for the linearly interpolated device coordinates corresponding to the centroid of the tetrahedron.

The methods described above may be simplified if a three-dimensional color space, for example, RGB color space, is used. In an embodiment, a reasonable palette may be constructed without performing Lab measurements. Instead, the steps described above may be performed directly in the device color space. In another embodiment, a uniformly sampled color palette that yields a uniform Delaunay tetrahedralization with periodic structure may be used to provide significant implementation simplification; however, this embodiment may result in reduced color quality compared to the more general methods described previously.

It should be noted that the present invention is particularly suitable for applications where a large number of device palette colors have already been pre-allocated, for example, to provide accurate reproduction of important colors. Because a number of colors have already been allocated, the freedom to choose the color palette to optimize color error is severely curtailed. In such cases, using the above described methods for low-noise dither generation provides the most pleasing dither for color encoding.

One skilled in the art will recognize that the present invention may be utilized in any number of devices, including but not limited to, computers, printers, displays, monitors, mobile phones, personal data assistants (PDAs), and the like. It should also be noted that the present invention may also be implemented by a program of instructions that can be in the form of software, hardware, firmware, or a combination thereof. In the form of software, the program of instructions may be embodied on a computer readable medium that may be any suitable medium (e.g., device memory) for carrying such instructions including an electromagnetic carrier wave.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

I claim:

1. A method for rendering an image color comprising the steps of:

selecting a set of up to four chosen palette colors such that the image color lies in a convex hull of the set of up to four chosen palette colors;

assigning weighted factors to each of the chosen palette colors, in the set of up to four chosen palette colors, such that the image color can be represented by a linear combination of the chosen palette colors in proportions given by the weighted factors;

ordering the chosen palette colors, in the set of up to four chosen palette colors, according to an ordering criteria; and outputting the chosen palette color, from the set of up to four chosen palette colors, that corresponds to the weighted factor that when added to the other weighted factors according the ordering criteria contains or equals a threshold value in a dither matrix.

2. The method claim 1 wherein the step of ordering the chosen palette colors, in the set of up to four chosen palette colors, according to an ordering criteria comprises ordering the chosen palette colors, in the set of up to four chosen palette colors, according to a first color parameter.

3. The method of claim 2 further comprising the step of:

responsive to two or more of the chosen palette colors, from the set of up to four chosen palette colors, possessing the same first color parameter value, ordering the chosen palette colors, in the set of up to four chosen palette colors, according to at least one additional parameter.

4. The method of claim 3 wherein the first color parameter is luminance and the at least one additional parameter is selected from the group comprising saturation and hue.

5. The method of claim 1 wherein the step of selecting a set of up to four chosen palette colors such that the image color lies in a convex hull of the set of up to four chosen palette colors comprises the step of computing a Delaunay tetrahedron.

6. The method of claim 5 wherein the step of computing a Delaunay tetrahedron further comprising selecting a Delaunay tetrahedron with the smallest diameter of the convex hull that includes the image color.

7. The method of claim 5 wherein the step of assigning weighted factors to each of the chosen palette colors, in the set of up to four chosen palette colors, such that the image color can be represented by a linear combination of the chosen palette colors in proportions given by the weighted factors comprises the step of computing the barycentric coordinates of the Delaunay tetrahedron.

8. A computer readable medium comprising a set of instructions for performing the method of claim 1.

9. A method for compressing the data representing a image color comprising the steps of:

selecting a set of up to four chosen palette colors such that the image color lies in a convex hull of the set of up to four chosen palette colors;

assigning weighted factors to each of the chosen palette colors, in the set of up to four chosen palette colors, such that the image color can be represented by a linear combination of the chosen palette colors in proportions given by the weighted factors;

identifying a chosen palette color from the set of up to four chosen palette colors to remove from the set of up to four chosen palette colors by comparing at least one weighted factor to a threshold value;

calculating redistributed weighted factors by redistributing the weighted factor of the chosen palette color removed from the set of up to four chosen palette colors to the remaining chosen palette colors in the set of up to four chosen palette colors; and representing the image color as the linear combination of the remaining chosen palette colors in proportions given by redistributed weighted factors.

10. The method of claim 9 wherein the step of selecting a set of up to four chosen palette colors such that the image color lies in a convex hull of the set of up to four chosen palette colors comprises the step of computing a Delaunay tetrahedron.

11. The method of claim 10 wherein the step of assigning weighted factors to each of the chosen palette colors, in the set of up to four chosen palette colors, such that the image color can be represented by a linear combination of the chosen palette colors in proportions given by the weighted factors comprises the step of computing the barycentric coordinates of the Delaunay tetrahedron.

12. The method of claim 9 wherein the step of identifying a chosen palette color from the set of up to four chosen palette colors to remove from the set of up to four chosen palette colors by comparing at least one weighted factor to a threshold value comprises the step of removing the chosen palette color that possesses a weighted factor below the threshold value.

13. The method of claim 9 wherein the step of identifying a chosen palette color from the set of up to four chosen palette colors to remove from the set of up to four chosen palette colors by comparing at least one weighted factor to a threshold value comprises the step of removing all of the chosen palette colors from the set of up to four chosen palette colors that do not exceed the threshold value.

14. The method of claim 9 wherein the step of calculating redistributed weighted factors by redistributing the weighted factor of the chosen palette color removed from the set of up to four chosen palette colors to the remaining chosen palette colors in the set of up to four chosen palette colors comprises the step of redistributing the weighted factor of the removed chosen palette color in proportion to the weighted factors of the remaining chosen palette colors.

15. A computer readable medium comprising a set of instructions for performing the method of claim 9.

* * * * *